United States Patent
Matsuki

(10) Patent No.: US 8,863,512 B2
(45) Date of Patent: Oct. 21, 2014

(54) SHAPE MEMORY ALLOY ACTUATOR SYSTEM

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 819 days.

(21) Appl. No.: 13/019,554

(22) Filed: Feb. 2, 2011

(65) Prior Publication Data

US 2011/0187296 A1   Aug. 4, 2011

(30) Foreign Application Priority Data

Feb. 3, 2010 (JP) .................................. 2010-022243

(51) Int. Cl.
*F01B 29/10* (2006.01)
*F02G 1/04* (2006.01)
*F03G 7/06* (2006.01)

(52) U.S. Cl.
CPC ...................................... *F03G 7/065* (2013.01)
USPC .............................................. 60/528; 60/527

(58) Field of Classification Search
USPC ................................................... 60/527–529
See application file for complete search history.

(56) References Cited

U.S. PATENT DOCUMENTS

| | | | |
|---|---|---|---|
| 4,977,886 A * | 12/1990 | Takehana et al. | 600/151 |
| 7,788,921 B2 * | 9/2010 | Takahashi | 60/528 |
| 7,839,260 B2 * | 11/2010 | Takahashi | 337/394 |
| 7,986,074 B2 | 7/2011 | Matsuki | |
| 2008/0247748 A1 | 10/2008 | Tanimura et al. | |
| 2009/0013684 A1 * | 1/2009 | Takahashi | 60/527 |
| 2009/0277300 A1 | 11/2009 | Matsuki | |

FOREIGN PATENT DOCUMENTS

| | | |
|---|---|---|
| EP | 2 117 057 A2 | 11/2009 |
| JP | 2008-276750 | 11/2008 |
| JP | 2009-19517 A | 1/2009 |
| JP | 2009-273253 A | 11/2009 |
| JP | 4832373 B2 | 12/2011 |
| JP | 5155731 B2 | 3/2013 |

OTHER PUBLICATIONS

Extended European Search Report dated Aug. 20, 2014 from European Application No. 11 15 1161.4.

* cited by examiner

*Primary Examiner* — Christopher Jetton
(74) *Attorney, Agent, or Firm* — Scully, Scott, Murphy & Presser, PC

(57) ABSTRACT

A shape memory alloy actuator system includes a shape memory alloy actuator, a mobile object, an elastic member, a first regulating member, and a second regulating member, a detecting section which detects a resistance value of the shape memory alloy wire, a calculating section which calculates an electric current applied, an output section, a control section which controls the detecting section, the calculating section, the output section. The calculating section calculates a first resistance value at which, a proportion of a resistance change with respect to a change in a unit temperature changes from a first proportion to a second proportion which differs from the first proportion, and the control section carries out a position control of the shape memory alloy actuator by the first resistance value, when the shape memory alloy wire is to be elongated.

10 Claims, 7 Drawing Sheets

SHAPE MEMORY ALLOY ACTUATOR SYSTEM

CROSS-REFERENCE TO RELATED APPLICATION

The present application is based upon and claims the benefit of priority from the prior Japanese Patent Application No. 2010-022243 filed on Feb. 3, 2010; the entire contents of which are incorporated herein by reference.

BACKGROUND OF THE INVENTION

1. Field of the Invention

The present invention relates to a shape memory alloy actuator system.

2. Description of the Related Art

In a shape memory alloy there are two states namely, an austenitic phase and a martensitic phase. When a temperature is low, the state changes to the martensitic phase, and when the temperature is high, the state changes to the austenitic phase. Particularly, at the time of a transition (a reverse transformation) from the martensitic to the austenitic, a substantial distortion restoring force is generated due to a small temperature difference. The shape memory alloy actuator is an actuator in which the distortion restoring force is used.

An actuator, in which a shape change of this shape memory alloy is used, has superior characteristics for small-sizing and making light weight of the actuator. Moreover, since a length of a shape memory alloy wire corresponds to a resistance value, a position control has been carried out by feeding back the resistance value.

For instance, a shape memory alloy actuator in which, a movable member is moved by using a shape memory alloy member with a bias spring imparting type, has been disclosed in Japanese Patent Application Laid-open Publication No. 2008-276750. In this case, a position control of the movable member is carried out by using a change in the resistance value according to a change in the temperature of the shape memory alloy member.

According to the technology disclosed, at the time of controlling the position of the movable member, a first change point X1 at which, a proportion A of a resistance change with respect to a unit temperature change for the shape memory alloy member changes from a first proportion A1 to a second proportion A2 which differs from the first proportion A1, and the position of the movable member is to be controlled based on a first resistance value R1 which imparts the first change point X1.

However, in the conventional method, a temperature change is imparted, and a change point is searched from a change in the resistance value per unit temperature change. In a method of finding the change point from a relationship of the temperature and the resistance value, it takes time till the temperature becomes stable. When an attempt is made to carry out the search of the change point in a short time, as the resistance value is not stabilized, an accuracy of relationship between the temperature and the resistance value is worsened. In other words, when an attempt is made to carry out the search for the change point in a short time, it is not possible to find an accurate change point.

SUMMARY OF THE INVENTION

The present invention has been made in view of the abovementioned circumstances, and an object of the present invention is to provide a shape memory alloy actuator system which carries out search of a change point of a resistance value in a short time and in a short time, and which determines a reference position of a mobile object.

To solve the abovementioned issues and to achieve the object, according to the present invention there is provided a shape memory alloy actuator system including a shape memory alloy actuator which has a shape memory alloy wire of which, a length changes by being contracted due to heating by supplying an electric power, and by being elongated due to cooling, a mobile object which is movable in a direction in which the length changes, an elastic member on which, an external force in a direction in which the shape memory alloy wire elongates, is exerted, a first regulating member which regulates a range of movement of the mobile object, on an elongation side, and a second regulating member which regulates a range of movement of the mobile object, on a contraction side, a detecting section which detects a resistance value of the shape memory alloy wire when the shape memory alloy actuator contracts and elongates, a calculating section which carries out a comparison operation of an output signal which has been acquired from the detecting section and a signal which has been input by a command section, and calculates an electric current applied corresponding to the resistance value which has been detected, an output section which outputs the electric current applied which has been output from the calculating section, to the shape memory alloy actuator, a control section which controls the detecting section, the calculating section, and the output section, and a reference resistance value calculating section, and the shape memory alloy actuator, the detecting section, the calculating section, the output section, the control section, and the reference resistance value calculating section collectively form a resistance control circuit which carries out a position control of the shape memory alloy actuator, and the resistance control circuit calculates a first resistance value at which, a proportion of a resistance change with respect to a change in a unit temperature changes from a first proportion to a second proportion which differs from the first proportion, and carries out the position control by the first resistance value, when the shape memory alloy wire is to be loosened.

Moreover, according to another aspect of the present invention, a shape memory alloy actuator system according to the present invention includes a shape memory alloy actuator which has a shape memory alloy wire of which, a length changes by being contracted due to heating by supplying an electric power, and by being elongated due to cooling, a first elastic member on which, an external force in a direction in which the shape memory alloy wire contracts, is exerted, a second elastic member on which, an external force in a direction in which the shape memory alloy wire elongates is exerted, a first mobile object which makes a contact with the first elastic member, and which is movable in a direction in which, the length of the shape memory alloy wire changes, a second mobile object which makes a contact with the second elastic member, and which is connected to the shape memory alloy wire, and which is movable in a direction in which the length of the shape memory alloy wire changes, a first regulating member which regulates a range of movement of the first mobile object, on an elongation side, a second regulating member which regulates a range of movement of the first mobile object, on a contraction side, and a third regulating member which regulates a movement of the second mobile object on a contraction side, a detecting section which detects a resistance value of the shape memory alloy wire when the shape memory alloy actuator contracts and elongates, a calculating section which carries out a comparison operation of an output signal which has been acquired from the detecting section and a signal which has been input by a command section, and calculates an electric current applied corresponding to the resistance value which has been detected, an output section which outputs the electric current applied which has been output from the calculating section, to the shape memory alloy actuator, a control section which controls the detecting section, the calculating section, and the output section, and a reference resistance value calculating section, and the shape memory alloy actuator, the detecting section, the calculating section, the output section, the control section, and the reference resistance value calculating section collectively form a resistance control circuit which carries out a position control of the shape memory alloy actuator, and the resistance control circuit calculates a first resistance value at which, a proportion of a resistance change with respect to a change in a unit temperature changes from a first proportion to a second proportion which differs from the first proportion, and a second resistance value at which, the proportion of the resistance change with respect to the change in the unit temperature changes from the second proportion to a third proportion which differs from the second proportion, and carries out the position control by the first resistance value, when the shape memory alloy wire is to be loosened, and carries of the position control by a resistance value between the second resistance value and a resistance value at which a change in the second resistance value and the resistance value has become constant, when the shape memory alloy is let to be contracted.

According to another preferable aspect of the present invention, for calculating the first resistance value which imparts a first change point, when the control section has received a request for measuring the first resistance value, a constant electric current is applied from the output section, and while the electric current is being applied, the control section stores the resistance value which has been detected by the detecting section in the storage section, and after it has been detected that the proportion of the resistance change with respect to the change in the unit time has become a constant resistance value, the control section reads the resistance value which has been acquired by the detecting section, and calculates the first resistance value.

According to still another preferable aspect of the present invention, a timing at which, the control section receives the request for measuring the first resistance value is a timing at which, an electric power supply of the shape memory alloy actuator system is put ON.

According to still another preferable aspect of the present invention, a timing at which, the control section receives the request for measuring the first resistance value is a timing at which, a measurement request from an outside has been input to the control section after an electric power supply of the shape memory alloy actuator system has been put ON.

DETAILED DESCRIPTION OF THE PREFERRED EMBODIMENTS

Exemplary embodiments of a shape memory alloy actuator system according to the present invention will be described below in detail with reference to the accompanying diagrams. However, the present invention is not restricted to the embodiments described below.

[First Embodiment]

Diagrams from FIG. 1 to FIG. 5 are diagrams showing a shape memory alloy actuator system according to a first embodiment of the present invention.

Figure 1:
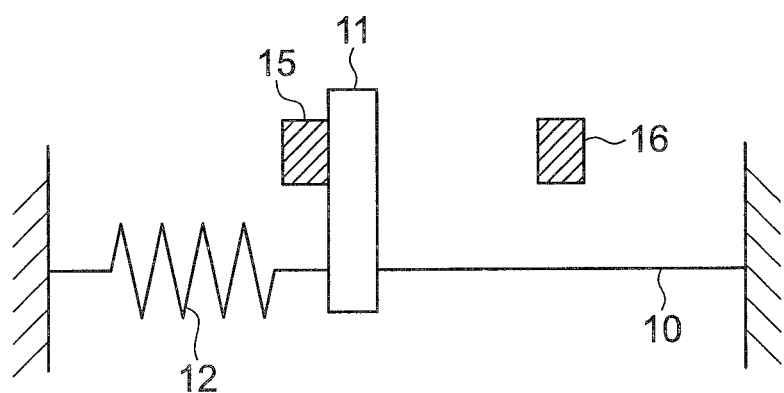
FIG. 1 is a diagram showing a shape memory alloy actuator according to a first embodiment of the present invention.

FIG. 1 is a schematic structure of a shape memory alloy actuator. One end of a shape memory alloy wire 10 is fixed and the other end is connected to a mobile object 11. The shape memory alloy wire 10 contracts upon being heated by passing an electric current through both ends thereof, and when applying of the electric current is stopped, the shape memory alloy wire 10 is cooled by ambient air and elongates.

The mobile object 11 is movable according to the contraction of the shape memory alloy wire 10. A first elastic member (spring) 12 is connected to the mobile object 11. The elastic member 12 is formed to generate an external force in a direction in which the shape memory alloy wire 10 elongates.

Moreover, a first regulating member 15 and a second regulating member 16 which regulate a range of movement of the mobile object 11 are provided. The shape memory alloy wire 10 is arranged to be such that there is a slight slack when the mobile object 11 is in contact with the first regulating member 15, and at halt.

Figure 2:
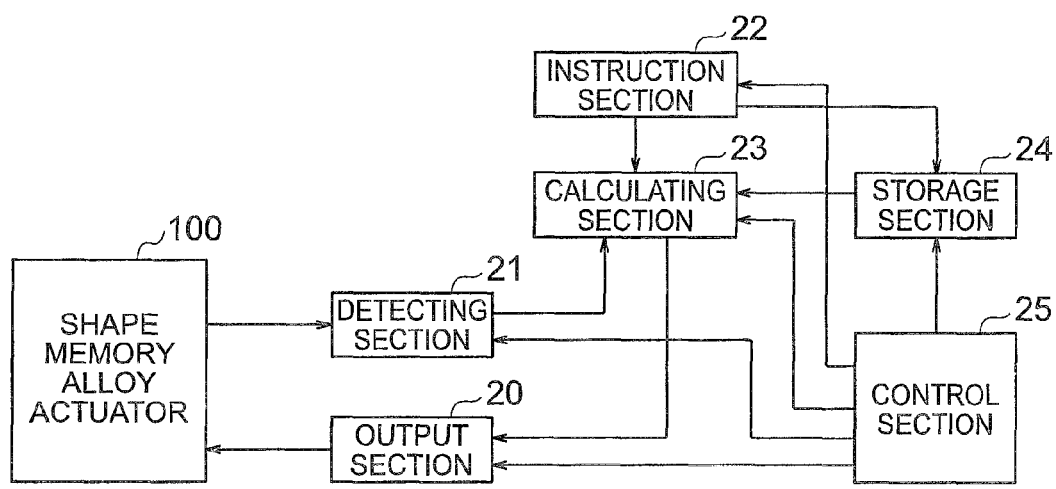
FIG. 2 is a diagram showing a shape memory alloy actuator system according to the first embodiment of the present invention.

FIG. 2 shows a block structure of the shape memory alloy actuator system. A shape memory alloy actuator system 100 includes an output section 20 which applies an electric current to the shape memory alloy actuator system 100, a detecting section 21 which detects a resistance value which changes due to the contraction of the shape memory alloy wire 10, an instruction section 22 which commands a control position of the mobile object 11, a calculating section 23 which acquires an instruction resistance value by converting an instruction position transmitted from the instruction section 22 to the resistance value, and calculates an amount of electric current necessary for moving the mobile object 11 to the instruction resistance value from a difference between the command resistance value obtained and the resistance value which has been detected by the detecting section 21, and outputs to the output section 20, a storage section 24 in which, a plurality of resistance values which are detected are stored temporarily, and a control section 25 which controls operations of the output section 20, the detecting section 21, the instruction section 22, the calculating section 23, and the storage section 24.

Figure 3:
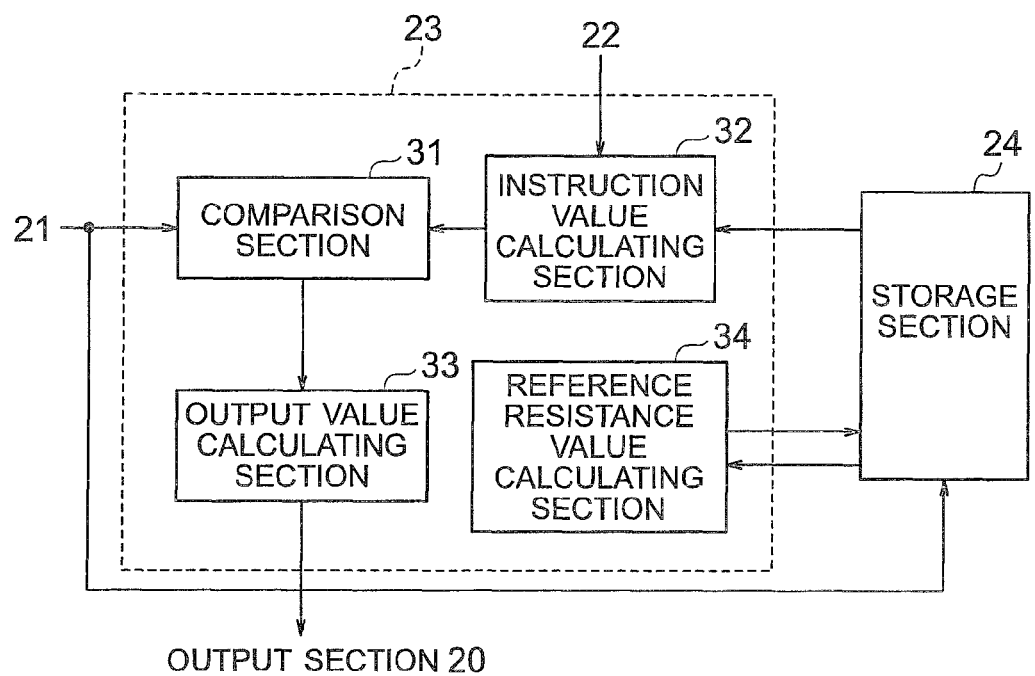
FIG. 3 is a diagram showing a structure of a calculating section of the first embodiment of the present invention.

FIG. 3 is a diagram in which functional blocks of the calculating section 23 are shown in further detail. The calculating section 23 includes an instruction-value calculating section 32 which converts the instruction position input from the instruction section 22 to the resistance value, a comparison section 31 which compares an instruction resistance value output from the instruction-value calculating section 32 and the resistance value input from the detecting section 21, and an output-value calculating section 33 which calculates an amount of current necessary for moving the mobile object 11 to the instruction resistance value, and a reference resistance value calculating section 34.

Figure 4:
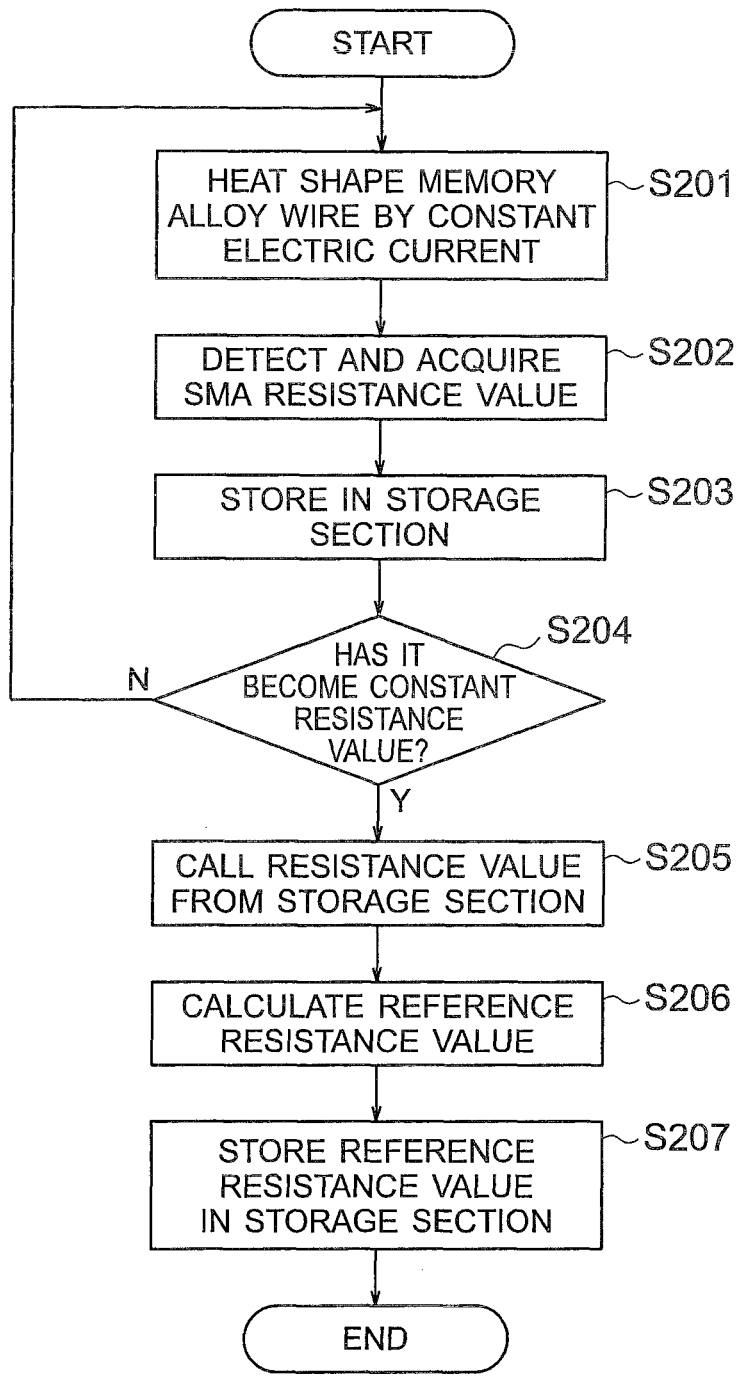
FIG. 4 is a diagram describing a flow of the first embodiment of the present invention.
Figure 5:
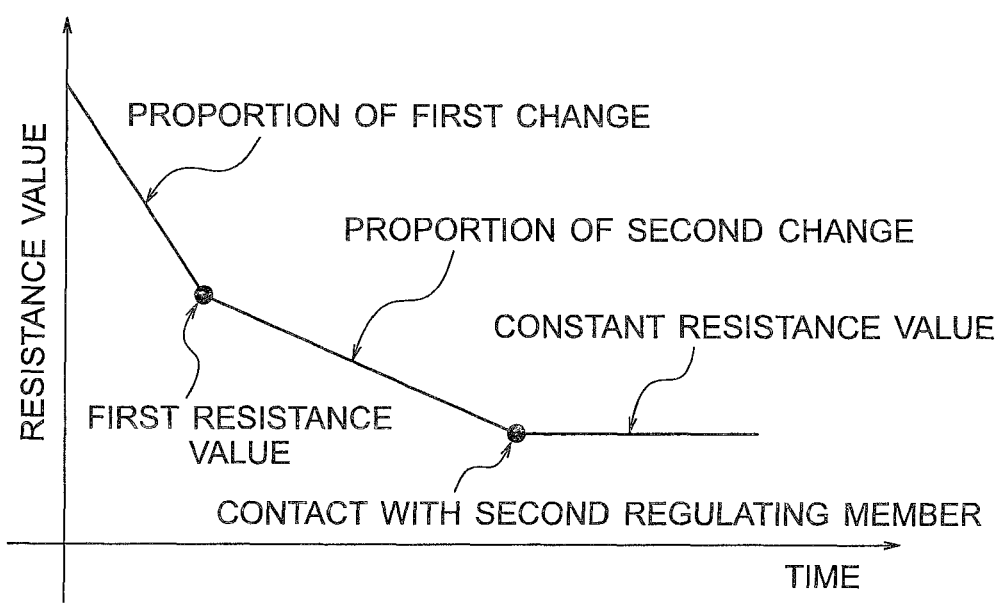
FIG. 5 is a diagram describing a relationship of a resistance value with time of the first embodiment of the present invention.

Next, a function of the reference resistance value calculating section 34 will be described below while describing an operation in the first embodiment. FIG. 4 is a diagram in which, a flowchart for calculating a first resistance value is shown. FIG. 5 is a diagram showing a relationship between time elapsed and a change in the resistance value when a constant electric current is applied.

A calculation flow of the first resistance value starts by a request command for calculating the first resistance being input.

At step S201, the output section 20 applies a constant electric current to the shape memory alloy wire 10. The shape memory alloy wire 10 starts contracting due to heating by supplying an electric power.

At step S202, the detecting section 21 detects and acquires a resistance value of the shape memory alloy wire 10.

At step S203, the storage section 24 stores the resistance value which has been detected by the detecting section 21. At step S204, a judgment of whether or not the resistance value has become constant is made.

Until an external force of the elastic member (spring) 12 acts on the shape memory alloy wire 10, the shape memory alloy wire 10 is in a no-load state. Therefore, change in a resistance value per unit time becomes substantial. Furthermore, when the shape memory alloy wire 10 contracts and the mobile object 11 is about to move away from the first regulating member 15, a load of the elastic member 12 is exerted toward elongation. When a force of contraction of the shape memory alloy wire 10 becomes more than the load of the elastic member 12, the mobile object 11 moves upon being separated from the first regulating member 15.

Consequently, the proportion of a change in the resistance value per unit time differs when there is a slack, and the mobile object 11 makes a contact with the first regulating member 15, and when the mobile object is separated from the first regulating member 15. In other words, the proportion of the change in the resistance value per unit time is moderate when the mobile object 11 is separated from the first regulating member 15 than when the mobile object 11 makes a contact with the first regulating member 15. Furthermore, when the contraction advances and the movement of the mobile object 11 is regulated upon making a contact with the second regulating member 16, the shape memory alloy wire 10 cannot be contracted any further. Therefore, the resistance value which is detected becomes constant.

At step S204, when a judgment is affirmative (YES), the mobile object 11 is judged to have made a stop at the second regulating member 16, and the process advances to step S205.

When the judgment is negative (NO), the mobile object 11 is judged not to have reached the second regulating member 16, and process returns to step S201, and the process of detecting and storing the resistance value continues.

At step S205, a plurality of resistance values of the shape memory alloy wire 10 corresponding to the time elapsed, which are stored in the storage section 24 are called.

At step S206, the reference resistance value calculating section 34 calculates a first resistance value which changes from a proportion of a first change to a proportion of a second change, from the resistance value which is stored. The first resistance value is a change point of a proportion of change per unit time, of the resistance value. In other words, the first resistance value shows a position at which, the mobile object is in contact with the first regulating member 15.

At step S207, the first resistance value is stored in the storage section 24, and the process ends.

The first resistance value which is stored is used as an instruction resistance value when the shape memory alloy wire 10 is elongated, and the position control is carried out.

In such manner, in the first embodiment, an arrangement is made such that the change in the resistance value per unit time takes place due to an action of the first regulating member 15, the second regulating member 16, and the elastic member 12. Therefore, it is possible to calculate accurately the resistance value at the position of the first regulating member 15 and the second regulating member 16, or in other words, the resistance value corresponding to the length of the shape memory alloy wire 10. Therefore, it is possible to facilitate an improvement in controllability.

When the electric current is varied, or in other words, when the temperature is changed, it takes time till the shape memory alloy wire 10 changes. Therefore, it is difficult to find an amount of change in resistance at the position of the first regulating member 15, and for calculating accurately, it is necessary to wait till the shape memory alloy wire 10 changes. Therefore it is not possible to find the first resistance value quickly. In the first embodiment, since the change in the resistance value becomes quick by applying a constant electric current, it is possible to calculate the first resistance value in a short time.

It is desirable that a timing of calculating the first resistance value is at the time of putting an electric power supply ON. When there is a secular change by calculating the first resistance value at an initial stage of driving the shape memory alloy actuator, it is possible to calculate the accurate first resistance value corresponding to that situation.

Moreover, as another timing, the first resistance value may be calculated at a timing at which a person who has been using the shape memory alloy actuator system has made a request for measuring the first resistance value. Accordingly, it is possible to calculate the first resistance value just before using the shape memory alloy actuator, and more accurate control is possible.

[Second Embodiment]

Figure 6:
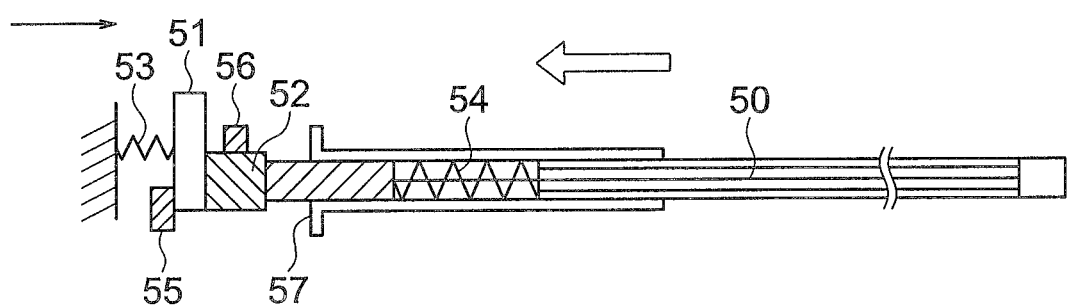
FIG. 6 is a diagram describing a structure of a second embodiment of the present invention.
Figure 7:
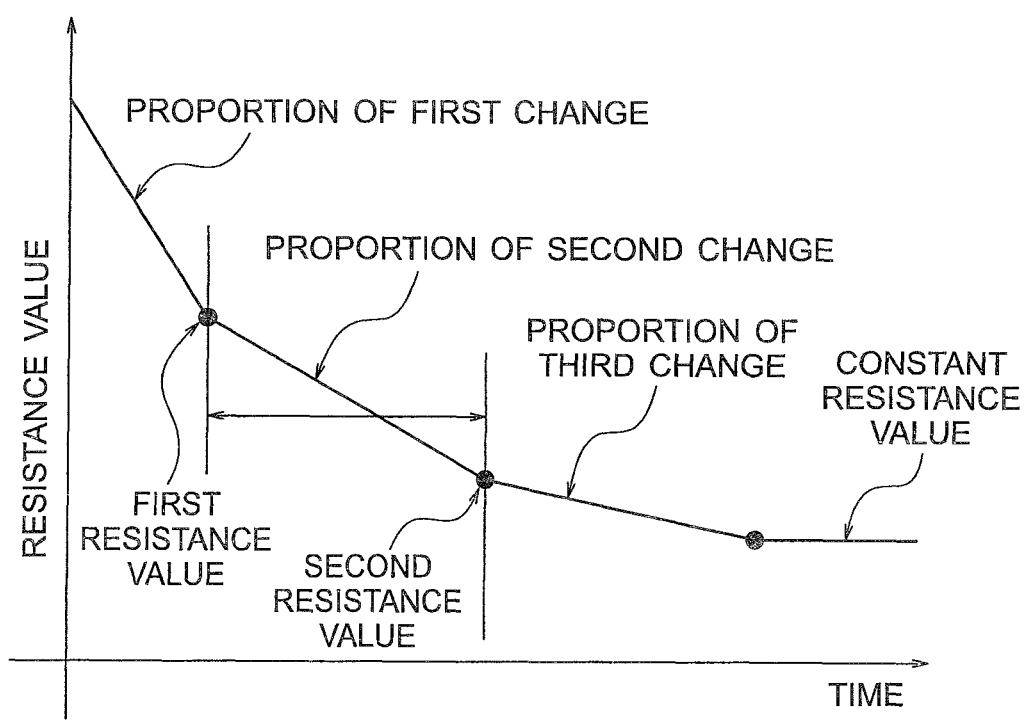
FIG. 7 is a diagram describing a relationship of a resistance value and time of the second embodiment of the present invention.

FIG. 6 and FIG. 7 are diagrams showing a shape memory alloy actuator system according to a second embodiment of the present invention. FIG. 6 shows a structure of a shape memory alloy actuator, and FIG. 7 shows an operation of the shape memory alloy actuator.

In the structure of the shape memory alloy actuator, a mobile object 51 is connected to a first elastic member 53 on which, a load in a direction of contraction of a shape memory alloy wire 50 is exerted. The mobile object 51 is movable in the direction of contraction of the shape memory alloy actuator.

Moreover, a mobile object 52 is provided. The mobile object 52 is connected to the shape memory alloy wire 50 via a second elastic member 54 on which, a load in a direction of elongation of the shape memory alloy wire 50 is exerted, and is movable in the direction of contraction thereof.

The movement of the mobile object 51 is regulated by a first regulating member 55 and a second regulating member 56, and the mobile object 51 is movable between the first regulating member 55 and the second regulating member 56. The mobile object 52 pushes the mobile object 51 when the shape memory alloy wire 50 elongates, and makes a contact with the mobile object 51 at a position where the mobile object 51 is regulated, and the movement thereof is regulated. An arrangement is made such that, when the shape memory alloy wire 50 contracts, the mobile object 52 makes a contact with a third regulating member 57, and the movement thereof is regulated.

FIG. 7 shows a relationship between time and a resistance value when a constant electric current is applied. When the constant electric current is started to be applied, a combined load of the first elastic member 53 and the second elastic member 54 is started to be exerted, similarly as in the first embodiment. In other words, during a time until the mobile object 51 is about to be separated from the first regulating member 55, an amount of the resistance change per unit time becomes substantial. A proportion of change during this time becomes a first proportion. Typically, the load on the first elastic member 53 and the load on the second elastic member 54 have the following relationship.

Load of the first elastic member 53<<load of the second elastic member 54

As the mobile object 51 separates from the first elastic member 53, the contraction force of the shape memory alloy wire 50 is necessary to resist the combined load of the first elastic member 53 and the second elastic member 54. Therefore, the amount of resistance change per unit time becomes moderate. A point at which the proportion of change changes becomes the first resistance value. Furthermore, the movement of the mobile object 51 is regulated at the second regulating member 56. Therefore, only a load of the second elastic member 54 is exerted from the second regulating member 56 to the third regulating member 57. Therefore, the load exerted on the shape memory alloy 50 becomes substantial, and the amount of resistance change per unit time becomes moderate. A point at which this proportion of change changes becomes the second resistance point.

The abovementioned first resistance value and the second resistance value at which, the proportion of change of the resistance value per unit time changes being equivalent to a position of the first regulating member 55 and a position of the second regulating member 56 respectively, the position control is to be carried in between. Generally, when the mobile object 52 has made a contact with the third regulating member 57, the shape memory alloy wire 50 cannot change any further. Therefore, when heated further, an excessive load is exerted on the shape memory alloy wire 50. However, by making an arrangement as in the second embodiment, since it is possible to control the length of the shape memory alloy wire 50 between the first regulating member 55 and the second regulating member 56, no excessive load due to excess heating as mentioned above is imparted. Consequently, not only the position control becomes accurate but also it is possible to make long a life of the shape memory alloy wire 50.

As a control position, the control has been carried out between the first regulating member 55 and the second regulating member 56. However, without restricting to such control, the control may be carried out at a resistance value between the second regulating member 56 and the third regulating member 57, at which, the first regulating member 55 and the third regulating member 57 do not make a contact. When such an arrangement is made, since the mobile object 51 can be positioned at two points namely the first regulating member 55 and the second regulating member 57, there is a further improvement in the position controllability.

A structure of the shape memory alloy actuator system and a timing of calculating the first resistance value and the second resistance value are similar as in the first embodiment.

In the shape memory alloy actuator system according to the present invention, the portion of changing of a change in the resistance value per unit time from the first proportion to the second proportion is a resistance value equivalent to the position of the first regulating member. In a case of using a resistance value corresponding to the temperature, it has been necessary to wait till the temperature becomes stable. However, in the present invention, it is possible to determine the position from the resistance value corresponding to time elapsed which does not depend on the temperature. Therefore, it is not necessary to wait till the temperature becomes stable. Consequently, since it is possible to search a change point of the resistance value, and to determine a reference position of the mobile object accurately and in a short time, there is shown an effect that the controllability is improved.

In such manner, the shape memory alloy actuator system according to the present invention is useful for a shape memory alloy actuator system of a bias spring imparting type, and particularly, is suitable for a shape memory alloy actuator system in which, improvement in the controllability is sought.

The present invention shows an effect that it is possible to provide a shape memory alloy actuator system which carries out a search of the change point of the resistance value, and determines a reference position of a mobile object accurately and in a short time.

What is claimed is:

1. A shape memory alloy actuator system comprising:
a shape memory alloy actuator which includes
a shape memory alloy wire of which, a length changes by being contracted due to heating by supplying an electric power, and by being elongated due to cooling,
a mobile object which is movable in a direction in which the length changes,
an elastic member on which, an external force in a direction in which the shape memory alloy wire elongates, is exerted,
a first regulating body which regulates a range of movement of the mobile object, on an elongation side, and
a second regulating body which regulates a range of movement of the mobile object, on a contraction side;
a detecting circuit which detects a resistance value of the shape memory alloy wire when the shape memory alloy actuator contracts and elongates;
a calculating circuit which carries out a comparison operation of an output signal which has been acquired from the detecting circuit and a signal which has been input by a command section, and calculates an electric current applied corresponding to the resistance value which has been detected;
an output circuit which outputs the electric current applied which has been output from the calculating circuit to the shape memory alloy actuator; and
a control circuit which controls the detecting circuit, the calculating circuit, and the output circuit,
wherein the shape memory alloy wire is arranged to be such that there is a slight slack when the mobile object is in contact with the first regulating body,
wherein the calculating circuit calculates a first resistance value at which, a proportion of a resistance change with respect to a change in a unit temperature changes from a first proportion to a second proportion which differs from the first proportion, and wherein the control circuit carries out a position control of the shape memory alloy actuator by the first resistance value, when the shape memory alloy wire is to be elongated.

2. The shape memory alloy actuator system according to claim 1, wherein for calculating the first resistance value which imparts a first change point, when the control circuit has received a request for measuring the first resistance value, a constant electric current is applied from the output circuit, and while the electric current is being applied, the control circuit stores the resistance value which has been detected by the detecting circuit in a storage circuit, and after it has been detected that the proportion of the resistance change with respect to the change in the unit time has become a constant resistance value, the control circuit reads the resistance value which has been acquired by the detecting circuit and calculates the first resistance value.

3. The shape memory alloy actuator system according to claim 2, wherein a timing at which, the control circuit receives the request for measuring the first resistance value is a timing at which, an electric power supply of the shape memory alloy actuator system is put ON.

4. The shape memory alloy actuator system according to claim 2, wherein a timing at which, the control circuit receives the request for measuring the first resistance value is a timing at which, a measurement request from an outside has been input to the control circuit after an electric power supply of the shape memory alloy actuator system has been put ON.

5. A shape memory alloy actuator system comprising:
a shape memory alloy actuator which includes
  a shape memory alloy wire of which, a length changes by being contracted due to heating by supplying an electric power, and by being elongated due to cooling,
  a first elastic member on which, an external force in a direction in which, the shape memory alloy wire contracts, is exerted,
  a second elastic member on which, an external force in a direction in which, the shape memory alloy wire elongates is exerted,
  a first mobile object which makes a contact with the first elastic member, and which is movable in a direction in which, the length of the shape memory alloy wire changes,
  a second mobile object which makes a contact with the second elastic member, and which is connected to the shape memory alloy wire, and which is movable in a direction in which the length of the shape memory alloy wire changes,
  a first regulating body which regulates a range of movement of the first mobile object, on an elongation side,
  a second regulating body which regulates a range of movement of the first mobile object, on a contraction side, and
  a third regulating body which regulates a movement of the second mobile object on a contraction side;
a detecting circuit which detects a resistance value of the shape memory alloy wire when the shape memory alloy actuator contracts and elongates;
a calculating circuit which carries out a comparison operation of an output signal which has been acquired from the detecting circuit and a signal which has been input by a command section, and calculates an electric current applied corresponding to the resistance value which has been detected;
an output circuit which outputs the electric current applied which has been output from the calculating circuit, to the shape memory alloy actuator; and a control circuit which controls the detecting section, the calculating section, and the output section,
wherein the shape memory alloy wire is arranged to be such that there is a slight slack when the mobile object is in contact with the first regulating body;
wherein the calculating circuit calculates a first resistance value at which, a proportion of a resistance change with respect to a change in a unit temperature changes from a first proportion to a second proportion which differs from the first proportion, and a second resistance value at which, the proportion of the resistance change with respect to the change in the unit temperature changes from the second proportion to a third proportion which differs from the second proportion, and
wherein the control circuit carries out a position control of the shape memory alloy actuator by the first resistance value, when the shape memory alloy wire is to be elongated, and carries out the position control by a resistance value between the second resistance value and a resistance value at which, a change in the second resistance value and the resistance value has become constant, when the shape memory alloy wire is let to be contracted.

6. The shape memory alloy actuator system according to claim 5, wherein for calculating the first resistance value which imparts a first change point, when the control circuit has received a request for measuring the first resistance value, a constant electric current is applied from the output circuit and while the electric current is being applied, the control circuit stores the resistance value which has been detected by the detecting circuit in a storage section, and after it has been detected that the proportion of the resistance change with respect to the change in the unit time has become a constant resistance value, the control circuit reads the resistance value which has been acquired by the detecting circuit and calculates the first resistance value.

7. The shape memory alloy actuator system according to claim 6, wherein a timing at which, the control circuit receives the request for measuring the first resistance value is a timing at which, an electric power supply of the shape memory alloy actuator system is put ON.

8. The shape memory alloy actuator system according to claim 6, wherein a timing at which, the control circuit receives the request for measuring the first resistance value is a timing at which, a measurement request from an outside has been input to the control circuit after an electric power supply of the shape memory alloy actuator system has been put ON.

9. A shape memory alloy actuator system comprising:
a shape memory alloy actuator comprising:
  a mobile object configured to be movable in a first direction and a second direction substantially opposite to the first direction;
  a first regulating body configured to regulate a movement of the mobile object in the first direction;
  a second regulating body separated from the first regulating member, the second regulating body being configured to regulate a movement of the mobile object in the second direction;
  a shape memory alloy wire connected to the mobile object, the shape memory alloy wire being configured:
    to undergo contraction due to heating through application of a constant current to exert a contraction force in the second direction on the mobile object, and
    to undergo elongation due to cooling, wherein a resistance value of the shape memory alloy wire decreases with a decrease in a length of the shape memory alloy wire from the contraction of the shape memory alloy wire in the second direction; and an elastic member connected to the mobile object, the elastic member being configured to exert an external force in the first direction on the mobile object, wherein the shape memory alloy actuator, under application of the constant current, is configured to transition:

from a first state in which the contraction force exerted on the mobile object is less than the external force exerted on the mobile object such that the mobile object remains in contact with the first regulating body and changes in the resistance value of the shape memory alloy wire per unit time is less than a first value, to a second state in which the contraction force exerted on the mobile object is greater than the external force exerted on the mobile object such that the mobile object is moved away from the first regulating body toward the second regulating body and changes in the resistance value of the shape memory alloy wire per unit time is greater than the first value and less than zero, and to a third state in which the mobile object is in contact with the second regulating body, movement of the mobile object in the second direction is regulated by the second regulating body, and there is no substantial change in the resistance value of the shape memory alloy wire per unit time;

a resistance value detection circuit configured to detect the resistance value of the shape memory alloy wire during the transition of the shape memory alloy actuator from the first state to the third state;

a calculation circuit configured to calculate an instruction resistance value of the shape memory alloy wire based on the resistance value of the shape memory alloy wire detected by the resistance value detection circuit, wherein the instruction resistance value corresponds to a length of the shape memory alloy wire as the shape memory alloy actuator transitions from the first state to the second state; and a control circuit configured to control a position of the mobile object based on the instruction resistance value.

10. A shape memory alloy actuator system comprising:
a shape memory alloy actuator comprising:
  a first mobile object configured to be movable in a first direction and a second direction substantially opposite to the first direction;
  a second mobile object configured to be movable in the first direction and the second direction;
  a first regulating body configured to regulate a movement of the first mobile object and the second mobile object in the first direction;
  a second regulating body separated from the first regulating body, the second regulating body being configured to regulate a movement of the first mobile object in the second direction;
  a third regulating body separated from the first regulating body and the second regulating body, the third regulating body being configured to regulate a movement of the second mobile object in the second direction;
  a shape memory alloy wire connected to the second mobile object, the second memory alloy wire being configured:
    to undergo contraction due to heating through application of a constant current to exert a contraction force in the second direction on the second mobile object, and
    to undergo elongation due to cooling,
    wherein a resistance value of the shape memory alloy wire decreases with a decrease in a length of the shape memory alloy wire from the contraction of the shape memory alloy wire in the second direction;
  a first elastic member connected to the first mobile object, the first elastic member being configured to exert a first external force in the second direction; and
  a second elastic member connected to the second mobile object, the second elastic member being configured to exert a second external force in the first direction,
  wherein the shape memory alloy actuator, under application of the constant current, is configured to transition:
    from a first state in which a combination of the contraction force exerted on the second mobile object and the first external force exerted on the first mobile object is less than the second external force exerted on the second mobile object such that the first mobile object remains in contact with the first regulating body, the second mobile object remains in contact with the first mobile object, and changes in the resistance value of the shape memory alloy wire per unit time is less than a first value,
    to a second state in which the combination of the contraction force exerted on the second mobile object and the first external force exerted on the first mobile object is greater than the second external force exerted on the second mobile object such that the first mobile object is moved away from the first regulating body toward the second regulating body while remaining in contact with the second mobile object and such that changes in the resistance value of the shape memory alloy wire per unit time is greater than the first value and less than a second value,
    to a third state in which the contraction force exerted on the second mobile object is greater than the second external force exerted on the second mobile object and the movement of the first mobile object in the second direction is regulated by the second regulating body such that the second mobile object is moved in the second direction away from the first mobile object and toward the third regulating body and such that changes in the resistance value of the shape memory alloy wire per unit time is greater than a second value, and
    to a fourth state in which the second mobile object is in contact with the third regulating body and movement of the second mobile object in the second direction is regulated by the third regulating body, and there is no substantial change in the resistance value of the shape memory alloy wire per unit time;
a resistance value detection circuit configured to detect the resistance value of the shape memory alloy wire during the transition of the shape memory alloy actuator from the first state to the fourth state;
a calculation circuit configured to calculate:

a first instruction resistance value and a second instruction resistance value of the shape memory alloy wire based on the resistance value of the shape memory alloy wire detected by the resistance value detection circuit,
wherein the first instruction resistance value corresponds to a length of the shape memory alloy wire as the shape memory alloy actuator transitions from the first state to the second state, and
wherein the second instruction resistance value corresponds to a length of the shape memory alloy wire as the shape memory alloy actuator transitions from the second state to the third state;
a control circuit configured to control a position of the first mobile object and the second mobile object based on at least one of the first instruction resistance value and the second instruction resistance value.

* * * * *